Feb. 10, 1925.
G. W. BAKER ET AL
1,525,601
MANUFACTURE OF RIBBED EXPANDED METAL
Filed Aug. 28, 1922     6 Sheets-Sheet 1
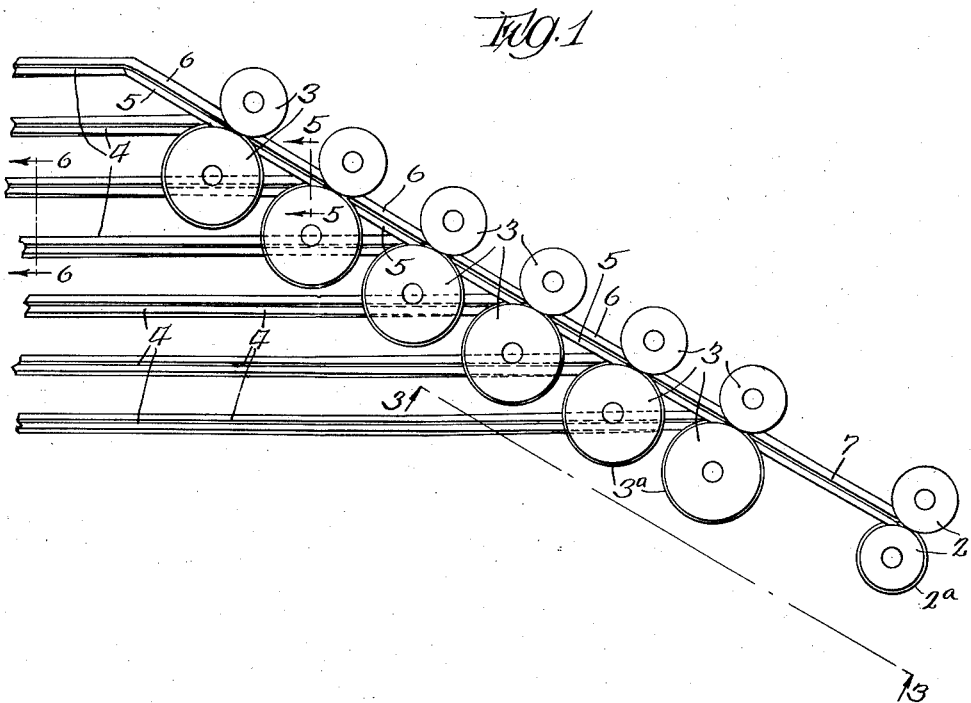
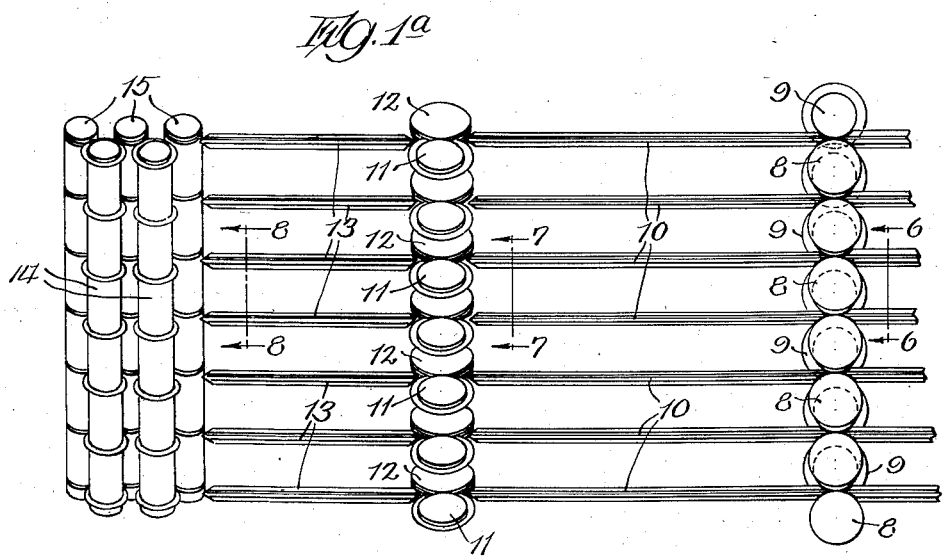
Inventors
George W. Baker
James H. Dean
by Fisher, Towle, Clapp & Soans Attys

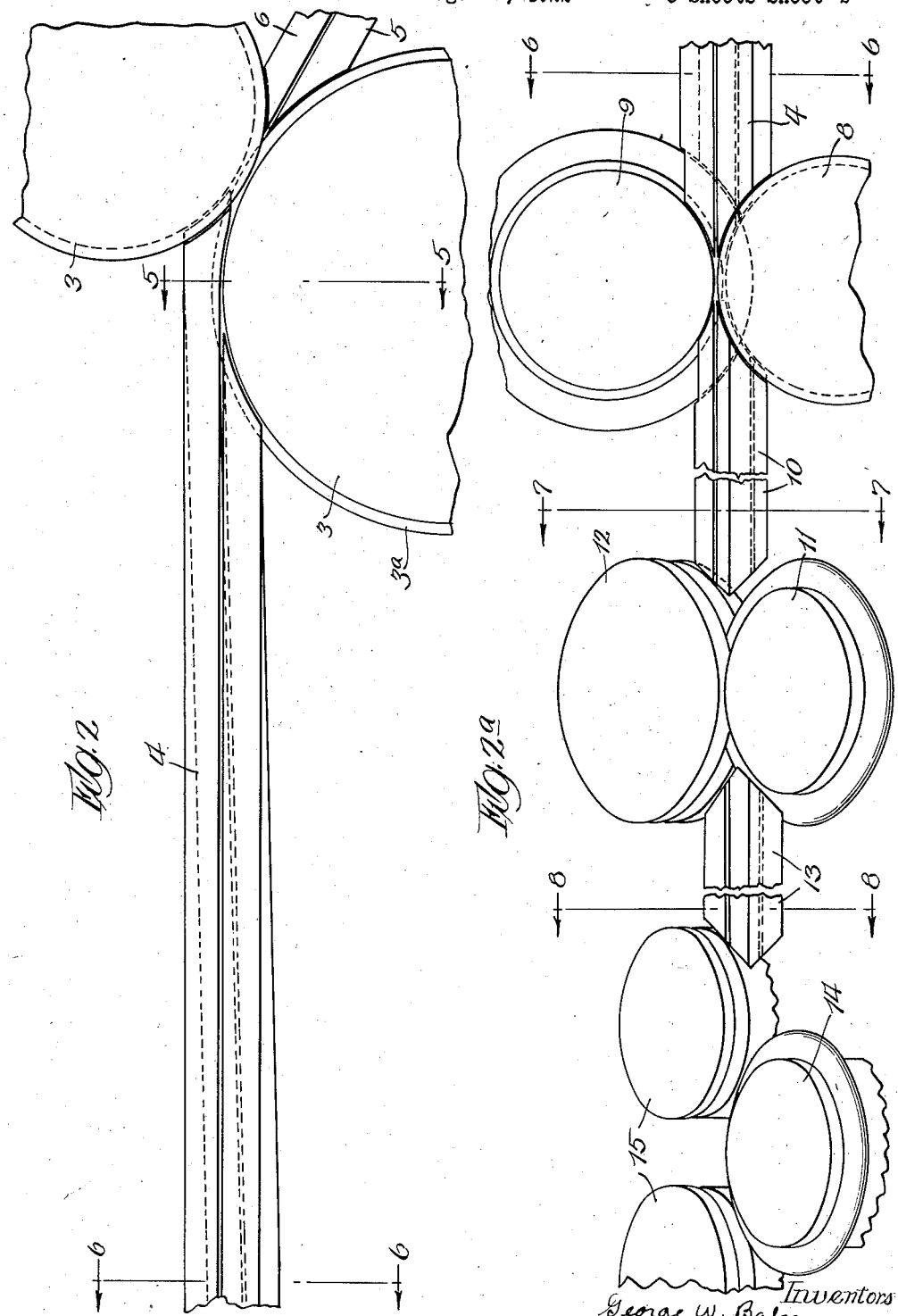

Feb. 10, 1925.
G. W. BAKER ET AL
1,525,601
MANUFACTURE OF RIBBED EXPANDED METAL
Filed Aug. 28, 1922 6 Sheets-Sheet 3
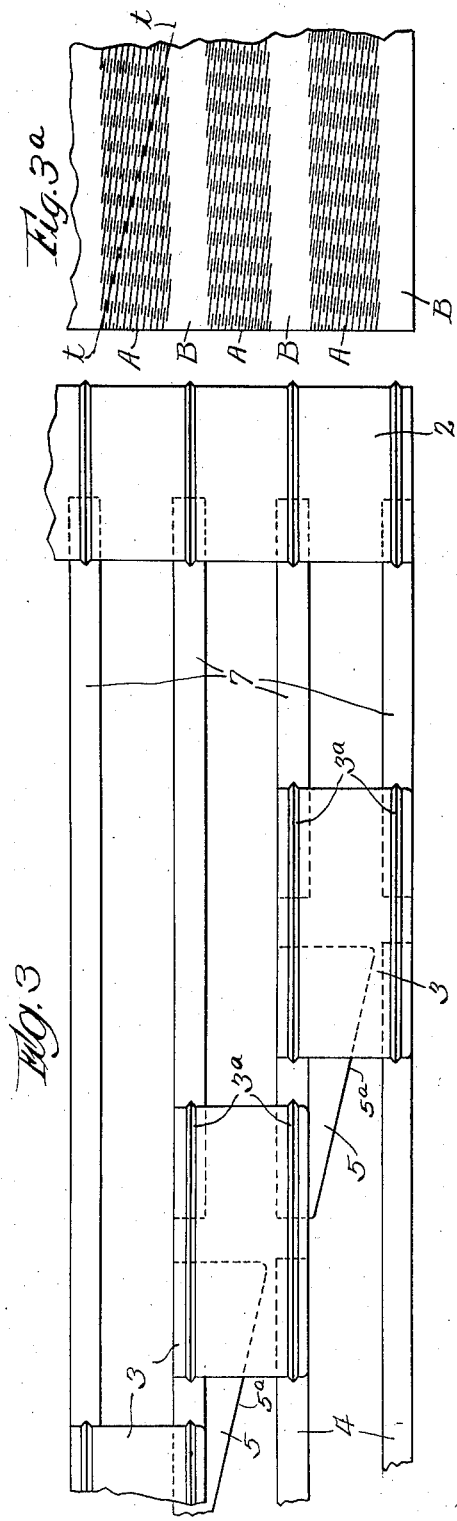
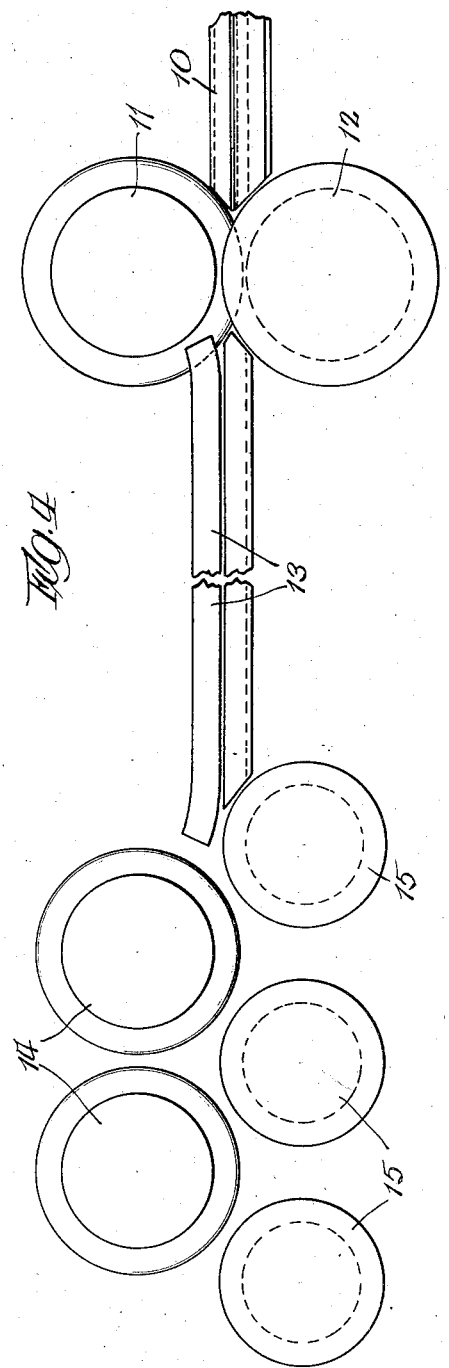
Inventors
George W. Baker
James H. Dean
by Fisher, Fowle, Clapp & Soans Atty's Feb. 10, 1925.
G. W. BAKER ET AL
1,525,601
MANUFACTURE OF RIBBED EXPANDED METAL
Filed Aug. 28, 1922      6 Sheets-Sheet 4
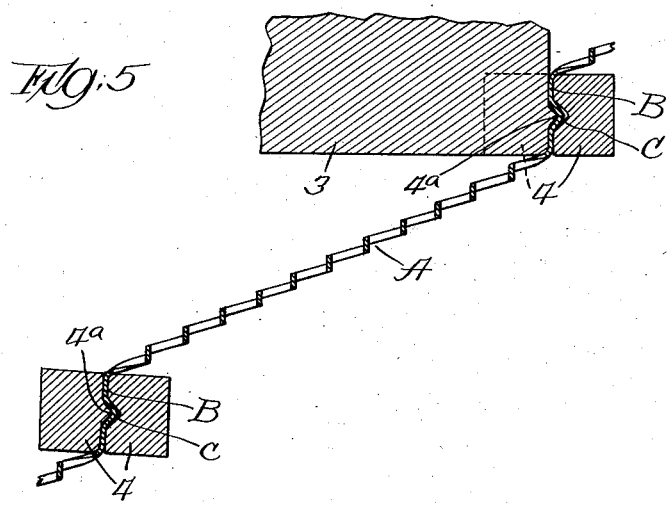
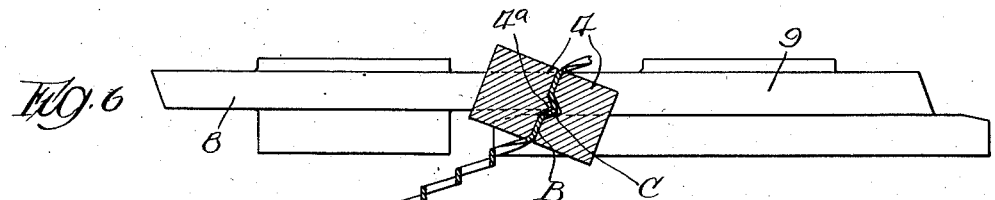
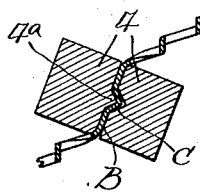
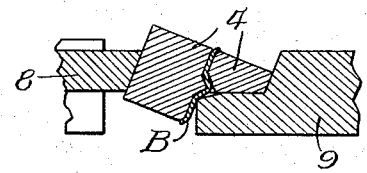
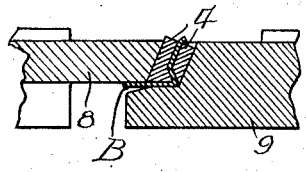
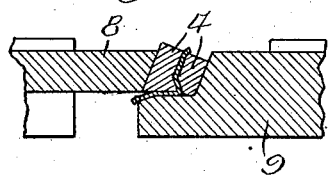
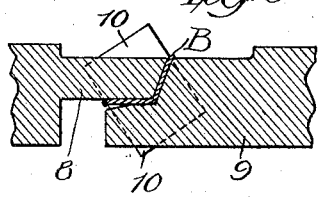
Inventors
George W. Baker
James H. Dean
by Fisher, Towle, Clapp & Soans Attys.

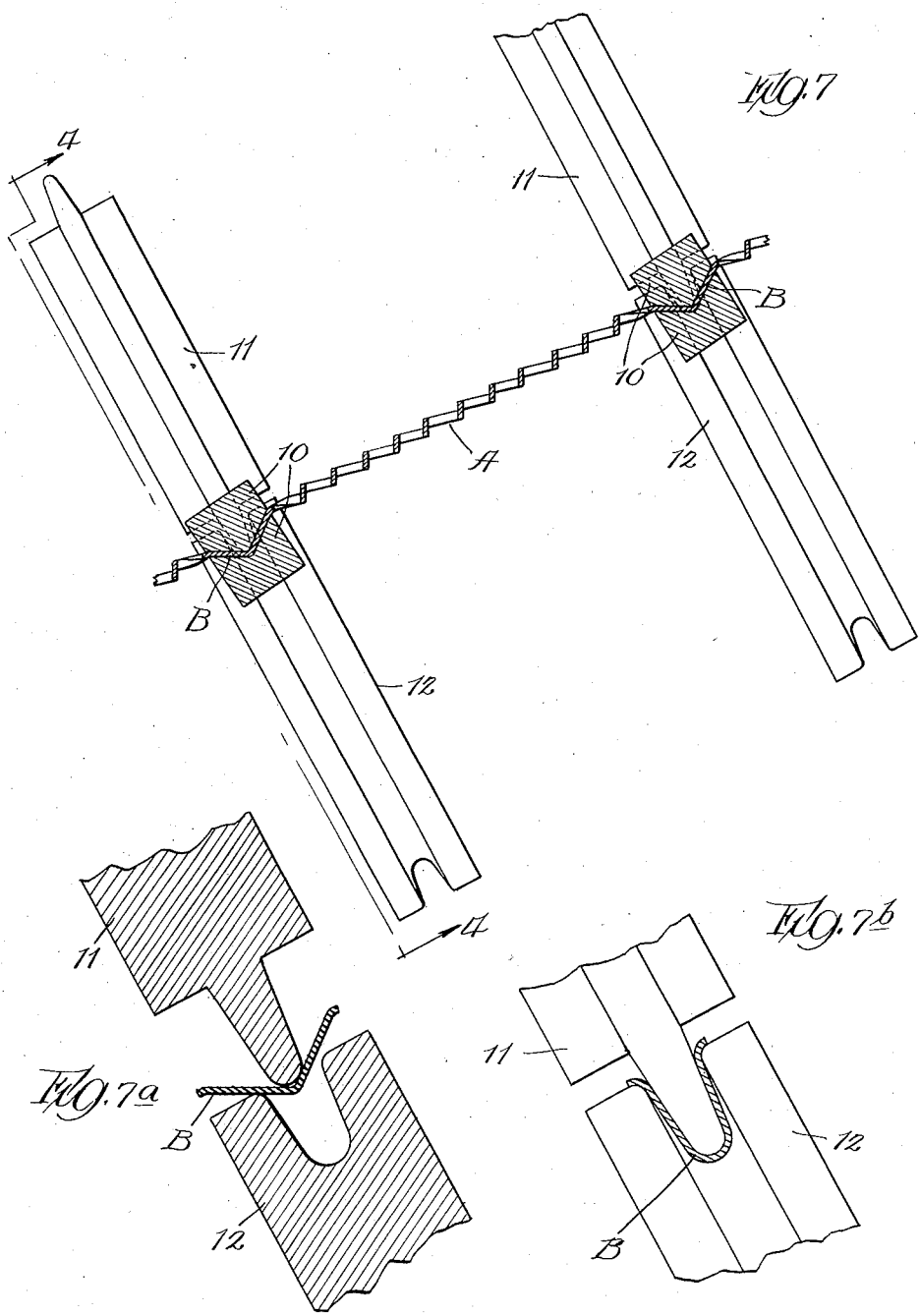

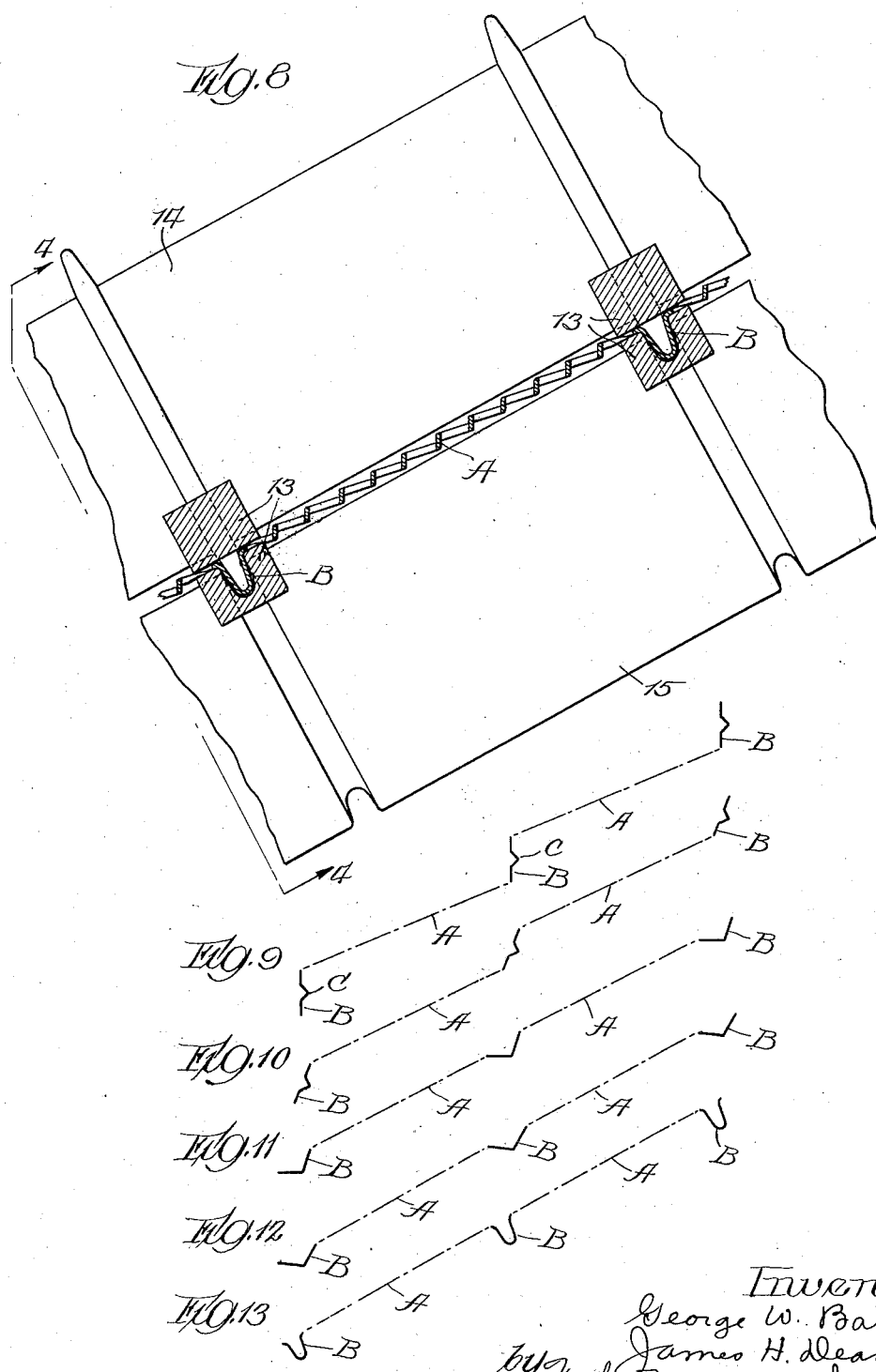

Patented Feb. 10, 1925.

1,525,601

UNITED STATES PATENT OFFICE.

GEORGE W. BAKER, OF JEANNETTE, PENNSYLVANIA, AND JAMES H. DEAN, OF LUDINGTON, MICHIGAN, ASSIGNORS TO NORTHWESTERN EXPANDED METAL COMPANY, OF CHICAGO, ILLINOIS, A CORPORATION OF ILLINOIS.

MANUFACTURE OF RIBBED EXPANDED METAL.

Application filed August 28, 1922. Serial No. 584,836.

*To all whom it may concern:*

Be it known that we, GEORGE W. BAKER, a citizen of the United States, residing in Jeannette, county of Westmoreland, and State of Pennsylvania, and JAMES H. DEAN, a United States citizen, and a resident of Ludington, county of Mason, and State of Michigan, have invented certain new and useful Improvements in the Manufacture of Ribbed Expanded Metal, of which the following is a specification.

The present invention relates to the manufacture of expanded metal lathing from sheets that are previously cut or slashed to form longitudinally and alternately disposed slitted and unslitted panels or strips. More particularly the invention relates to a machine for forming ribbed expanded metal such as shown in the United States Letters Patent of F. C. Arey, No. 1,318,953, dated October 14, 1919, and which is provided with means for expanding slitted metal sheets having alternately disposed slitted and unslitted panels, and is also provided with means for forming the slitted panels into ribs.

The invention seeks to provide an improved method and improved means for guiding the sheets and ribbing the unslitted strips thereof by which the slitted panels of the sheets may be rapidly expanded and the unslitted strips ribbed without tearing or breaking the metal and which prevents the sheets from becoming displaced as they are operated upon. With these and other objects in view as it will presently appear, the invention consists in the features of improvement hereinafter set forth, illustrated in the preferred embodiment in the accompanying drawings and more particularly pointed out in the appended claims.

Inasmuch as the present improvement may be applied to a machine having a frame and means for driving the feeding, expansion and shaping rolls, which are in all substantial respects similar to that shown in the Arey patent, such frame work and driving means are, for the sake of clearness, omitted from the accompanying drawings, which are consequently somewhat diagrammatic.

In the drawings:

Figs. 1 and 1ª together form a plan view of the rolls and guides of the improved machine;

Figs 2 and 2ª form a plan view on an enlarged scale of one set of expansion and rib-forming rolls and the cooperating guides;

Fig. 3 is a detail view in elevation of a portion of the initial feeding rolls and two sets of expansion rolls looking in the direction of the arrows 3 in Fig. 1;

Fig. 3ª is a view of a portion of the metal sheet adapted to be operated upon to form ribbed expanded metal;

Fig. 4 is a detail section on the lines 4—4 of Figs. 7 and 8 of the rib-finishing rolls and the straightening rolls;

Figs. 5 and 6 are detail sections on the lines 5—5 and 6—6 respectively of Figs. 1, 1ª, 2 and 2ª, illustrating the twisting operation of the means for guiding the unslitted strips of the sheet;

Figs. 6ª, 6ᵇ, 6ᶜ and 6ᵈ are detail sections illustrating the operation of the rotary dies or rolls which form the unslitted strips of the sheet into rudimentary ribs that are preferably of V-form;

Fig. 7 is a detail section on the line 7—7 of Figs. 1ª and 2ª;

Figs. 7ª and 7ᵇ are detail sections illustrating the operating of the rib finishing rolls;

Fig. 8 is a detail section on the line 8—8 of Figs. 1ª and 2ª;

Figs. 9 to 13 inclusive are diagrammatic views illustrating the sheet in different stages of its manufacture as it passes through the machine.

As in the machine set forth in the Arey patent above referred to and in the U. S. patent to George W. Baker for machine for making ribbed expanded metal, No. 1,443,555, dated January 30, 1923, the machine is provided at one end with a pair of vertical feeding rolls 2 and in rear of which are arranged a number of sets or pairs of rolls 3 having vertical axes and disposed in an inclined stepped series with the rolls of each pair or set arranged on opposite sides of the initial path of movement of the slitted sheet as it is fed into the machine. Also as set forth in the prior patent and application referred to, a set of horizontal parallel guides or deflecting devices are arranged in inclined or angular relation to the sets of rolls 3 and in a corresponding stepped series.

The metal sheets which are previously cut or slashed to form slitted panels A and intermediate unslitted strips B (see Fig. 3ª), are fed on edge and in a vertical plane between the rolls 2 which are of sufficient length to accommodate the widest sheet to be expanded. Preferably one of each set of rolls 2 is provided with shallow ribs 2ª and the companion roll with similar grooves so located as to form narrow, shallow ribs C in the unslitted strips of the metal sheet. The rolls 3 and guides 4 are also provided with similar ribs 3ª and 4ª and associated grooves which are adapted to engage the shallow ribs of the metal sheet and hold it against displacement as it passes through these rolls and guides and is expanded.

Each set of the stepped series of rolls 3 project downwardly below the next adjacent set to a distance substantially equal to or slightly less than the combined width of one of the slitted panels and one of the unslitted strips of the sheet. The sets of rolls also overlap in vertical direction and are of such width that each set engages one of the slitted panels of the sheets and the two adjacent unslitted strips. The guides or deflecting devices 4, which comprise front and back rails, extend respectively into snug relation with the lower ends of the front and back rolls 3 of the corresponding set at the delivery side of the bight of the rolls. The rails of each guide are spaced apart to form a guide-way or pass which at the point adjacent the rolls lie in vertical planes and are tangent to the front rolls of the corresponding sets. The guide-way or pass of each deflecting device has a width slightly greater than the thickness of the metal sheet and a depth slightly narrower than the width of one of the unslitted strips or panels. Preferably the portion of the pass through which the shallow ribs C of the sheet move are slightly wider than the other portions of the guide-way to avoid the binding of the ribs in the guide. As the unslitted panels or strips of the sheet pass between the lower ends of the rolls 3 they are deflected laterally at different points in the path of travel of the sheet into the passes of the guides 4 and the intermediate slitted panels are expanded.

As set forth in the Baker application above referred to, guides 5 and 6 are also arranged between the sets of rolls 3 and guides 7 are provided between the rolls 3 and the initial feeding rolls 2. The passes of these guides are, of course, tangent to the rolls between which they are arranged and the guides are adapted to engage the unslitted strips of the sheet and have suitable ribs and grooves for cooperating with the shallow ribs C which, as stated, are preferably formed in the sheet by the feeding rolls 2. Also, as set forth in the Baker application, the guide 5 arranged between each pair of rolls 3 is arranged to overlap the adjacent slitted panel of the sheet and has an inclined lower face 5ª forming an inclined edge over which the mesh sections of the slitted panel are successively deflected and expanded.

As shown in Fig. 3ª, the slitted panels of the metal sheet are provided with slits arranged in rows with bonds between the slits of each row and opposite the slits of adjacent rows, the rows of slits being inclined to the longitudinal margins of the sheet at an angle determined by the relation between the transverse spacing of the rows of slits and the longitudinal spacing between the centers of the bonds. With this arrangement, the slits in adjacent rows are disposed in a number of inclined series—one of which is indicated by the line $t$—$t$ in Fig. 3ª—and each series is adapted to be expanded to form an inclined series of diamond-shaped openings. The stepped series of rolls 3 and the stepped series of guides 4 are so located that the horizontal distances between the bights of two adjacent sets of rolls and between the ends of two adjacent guides correspond to the horizontal distance between the ends of an inclined series of slits, and the inclined edges of the plates or guides 5 are so disposed that all portions of each inclined series of slits pass simultaneously over the edge of one of the guides 5 and at the same time that the portions of the adjacent unslitted strips at the ends of the series pass through the bights of the adjacent sets of rolls and into the ends of two adjacent guides. Thus the entire sheet is progressively deflected about a continuous line that extends at right angles across the paths of movement of the unslitted strips and at an acute angle across the paths of movement of the slitted panels and which acute angle corresponds to the inclination of the inclined series of slits in the slitted panels of the unexpanded sheet.

In this way the unslitted strips are deflected by the guides 4 to expand the slitted panels and bring the latter into a series of inclined planes, as indicated in Figs. 5 and 9. To facilitate the bending of the metal adjacent the edges of the unslitted strips, the edge portions of the rolls 3 and of the guides 4 over which they are deflected are preferably rounded as most clearly indicated in Fig. 5, and also for this reason the rails of the guides 4 are preferably slightly narrower than the unslitted strips of the metal sheet.

The expansion of the slitted panels places the metal under considerable tension and this tension is apt to displace the sheet as it is passed through the machine, particularly if it is rapidly operated. For this reason, the deflecting guides 4, or the portions of the guides adjacent the rolls 3, are shaped to gradually rotate or turn the unslitted strips about their longitudinal axes and in proper direction to relieve the tension on the unslitted panels. The twisted portions of the guides 4 are shown in Figs. 1 and 2, and the operation is indicated in Figs. 5 and 6 and in Figs. 9 and 10. Fig. 9 represents a section of the sheet as it passes around the rolls 3 and into the guides 4. At this point, as indicated, the unslitted strips lie in vertical planes and the expanded panels in inclined planes, both the panels and strips being disposed on opposite sides of the general plane of the sheet. As the strips move through the passes of the deflecting guides 4 they are progressively turned or permitted to rotate about their central longitudinal axes toward the general plane of the sheet to thereby flatten or partially flatten the sheet and relieve the tension on the expanded panels. In this way the tendency of the tension of the expanded panels to displace the expanded sheet is obviated.

The guides 4 deliver the expanded sheet to a number of pairs of rotary dies or rolls arranged in stepped series and which, in the form shown, are mounted upon vertical axes. Each pair or set comprises rolls 8 and 9 which are provided with a pass of expanded V-form. The roll 8 is provided with a conical working face which cooperates with the conical portion of the roll 9, and the roll 9 is provided with a flange which extends beneath the edge of the companion roll 8. One arm of the V-shaped pass lies between the conical portions of the rolls and the other between the horizontal flange of the roll 9 and the lower face of the roll 8. These pairs or sets of rolls are so disposed that the passes between the conical portions thereof are in alinement with the inclined passes at the delivery ends of the twisted guides 4, so that the upper portions of the unslitted strips of the sheet pass between the sets of rolls 8—9 without being deflected. However, the lower portions thereof are progressively deflected or turned into horizontal planes as they pass over the flanges of the rolls 9 and at the same time the shallow ribs C are removed. The operation of the rolls 8 and 9 thus shape the strips into rudimentary ribs of expanded V-form, as illustrated progressively in Figs. 6ª, 6ᵇ, 6ᶜ and 6ᵈ. To insure the proper operation, the rails of each guide 4 and particularly the front rail is extended as close as possible to the bight of the corresponding set of shaping rolls or dies 8 and 9, and in thus extending the guides the portions of the rails in line with the flange of the roll 9 must of course be cut away, as indicated in these figures, but the upper portions thereof serve to hold each strip in proper relation to the flange of the roll 9 so that it will be shaped in the manner indicated.

In thus changing the shape of the unslitted strips from that shown in Figs. 6 and 10, to that shown in Figs. 6ᵈ and 11, no tension is placed upon the expanded panels and although the strands that merge into the lower edges of the strips are twisted, they are not sharply bent. It should also be noted that by this operation the sheet as a whole is further flattened and, if desired, the rotary dies or rolls 8 and 9 may be arranged to bring all of the expanded panels into the same plane. However, in the particular machine to which the present invention has been applied and which is shown in the drawings, the expanded panels are to a slight extent out of alinement after passing the sets of rolls 8 and 9 and it is necessary to further rotate or turn the ribs about their longitudinal axes through a slight angle to bring the panels into the same plane. This may be effected by slightly twisting the guides 10 which engage the ribs as they leave the initial rib-forming rolls 8 and 9, but preferably these guides are straight and the slight turning of the ribs is effected by the rib-finishing rolls 11 and 12.

The guide-ways or passes of the guide rails 10 are in line with and conform in outline to the passes of the roller dies 8 and 9, and the receiving ends of these guides are arranged closely adjacent the rolls in order to properly strip the ribs therefrom. The delivery ends of the guides 10 terminate some distance from the rib-finishing rolls 11 and 12, so that the latter may rotate or turn the ribs through a slight angle. The rotary dies or rolls 11 and 12 are provided with ribs and grooves of proper outline to form the ribs into their final U-shape, as shown in Figs. 7ᵇ and 13. The rolls 11 and 12 are mounted on axes which are inclined to the horizontal to correspond with the angle of inclination of the general plane of the sheet as it passes from the guides 10. But as the sheet approaches these rolls the extended panels, as stated, are still slightly inclined to the general plane of the sheet and the ribs are positioned relatively to the rolls, as shown in Fig. 7. The engagement of one set of the rolls with each of the ribs serves first to rotate it about a longitudinal axis through a slight angle from the position shown in Fig. 11 to that shown in Fig. 12, and thereby all of the expanded panels are brought into the same plane.

To prevent the formation of the deep U-shaped ribs by the rolls or dies 11 and 12 from stretching or unduly stretching the expanded panels, the strips between the expanded panels are brought slightly closer together by the guides 10, which, while straight, are so relatively inclined that their delivery ends are slightly closer together than their receiving ends. Preferably, the horizontal distances between the guides remain the same, and the vertical spacing between them is gradually diminished, the arrangement being such that the general plane of the sheet is turned about the longitudinal axis of the central guide so that its angle of inclination to the horizontal is slightly diminished as it passes through the guides. In other words the set of guides 10 are so relatively inclined that the delivery end of the set is inclined at a less angle to the horizontal than its receiving end. Fig. 11 shows the position of the sheet at the outer ends of these guides. The angle of inclination of the axes of the rotary dies 11 and 12 corresponds of course to that of the delivery end of the set of guides 10, and since the latter bring the strips of the sheet closer together, the expanded panels are not unduly stretched by the formation of the strips into deep ribs. Hence this operation does not tend to tear or distort the sheet. It should also be noted that the engagement of the rib-finishing rolls 11 and 12 with the initial V-formation of the ribs insures that the sheet will be maintained in proper relation with these rolls as it passes through them.

The ribs are stripped from the rolls 11 and 12 by a set of guides 13, the lower rails of which are grooved to receive the ribs. The guides 13 deliver the sheet to a set of rolls comprising upper ribbed rolls 14 and lower grooved rolls 15 mounted on parallel axes inclined at an angle to conform with the angle of inclination of the axes of the rolls 11 and 12. The rolls 14 and 15 are staggered as shown, and are mounted so that they can be adjusted to form slightly sinuous paths for the ribs so that the latter are properly straightened and are given a permanent set to maintain the sheet as a whole in flattened form and remove any tendency that it may have to twist.

The rolls and guides described are mounted on a suitable frame work such as shown in the prior Arey patent, and the rolls are driven by suitable gearing, as shown in such prior patent, so that they will have the same peripheral speed. Preferably the portions of the rolls 3 which engage the unslitted strips and the conical portions of the rolls 8 and 9 are knurled so as to securely engage the strips and properly advance the sheet.

By the improved method and means set forth the sheets may be rapidly brought to finishing form with the minimum of waste and breakage. The extent to which the slitted panels are expanded is determined by the angle of inclination of the deflecting guides with respect to the path of movement of the sheet into the machine. While this angle may be varied in accordance with different conditions it is preferably about 30 degrees, and as it is deflected and expanded the sheet is so disposed that its general plane occupies an angle of about $32\frac{3}{4}$ degrees to the horizontal, and the set of the initial rib-forming rolls 8 and 9 is correspondingly inclined. As the unslitted strips are deflected from their initial paths of movement by the rolls 3 and guides 4, they are still maintained in vertical planes as indicated in Fig. 9, but, as described, are gradually turned about their longitudinal axes as they pass through the guides 4 to relieve the tension on the expanded panels and thus prevent its tension from displacing the sheet as it passes through the deflecting guides 4 and the rolls 8 and 9. The angle through which the strips are thus turned or rotated may vary to suit the different conditions but in the construction illustrated this angle of twist is 21 degrees. The lower halves of the ribs are brought into horizontal planes as they are operated upon by the rotary dies or rolls 8 and 9, and the ribs as a whole are rotated in the same direction through a slight angle of $5\frac{1}{2}$ degrees as they are engaged by the rib-finishing rolls 11 and 12 and thereby bring all of the expanded panels into the same plane. As noted, the initial rib-forming rolls 8 and 9 could be arranged to completely flatten the sheet, if desired. As the sheet passes through the guides 10 it is rotated slightly as stated about the longitudinal axis of the central guides so that it is presented to the rib-finishing rolls 11 and 12 with the general plane of the sheet at an angle of 29 degrees to the horizontal and which corresponds to the angle of inclination of the axes of these rolls and of the straightening rolls 14 and 15. These details may of course be varied but have been found suitable for expanded slitted metal proportioned substantially as indicated in Fig. 3ª. Other changes may be made from the details set forth without departure from the essentials of the invention as defined in the claims.

We claim as our invention:—

1. In a machine for expanding sheet metal having alternate slitted panels and unslitted strips, the combination with means for advancing the sheet, of means for deflecting the strips into a series of spaced paths to thereby expand the slitted panels, said deflecting and expanding means being arranged to guide the strips so as to relieve the tension on the expanded panels.

2. In a machine for expanding sheet metal having alternate slitted panels and unslitted strips, the combination with means for continuously advancing the sheet, of an inclined series of devices for deflecting the strips from the original plane of the sheet about lines at right angles to the direction of movement of the sheet into a series of spaced paths angularly disposed to the original plane of the sheet and thereby expand the slitted panels, said deflecting devices being arranged to progressively relieve the tension on the expanded panels.

3. In a machine for forming ribbed expanded metal from sheets having alternate slitted panels and unslitted strips, the combination with means for feeding the sheet and guiding means for deflecting the strips at different points in their paths of travel to thereby expand the panels, of shaping dies having passes, portions of which are substantially in alinement with the paths of movement of the strips through said guides and other portions of which passes are arranged to turn portions of the strips toward the general plane of the sheet and thereby form rudimentary ribs in the strips.

4. Means for ribbing sheet metal having alternate expanded panels and unslitted strips angularly disposed to the panels, comprising guides for the strips, rotary dies cooperating with said guides and having passes portions of which are disposed substantially in alinement with the passes of the guides and other portions of which die passes are arranged to turn portions of the strips toward the general plane of the sheet and form rudimentary ribs and additional rotary dies for completing the shaping of the ribs.

5. In a machine for forming ribbed expanded metal from sheets having alternate slitted panels and unslitted strips, means for feeding the sheets, means arranged to deflect the strips at different points in their paths of travel and thereby expand the panels and to rotate the strips to partially flatten the sheet and relieve the tension on the expanded panels, means for shaping the strips into rudimentary ribs arranged to further flatten the sheet, and means for completing the shaping of the ribs.

6. In a machine for forming ribbed expanded metal from sheets having alternate slitted panels and unslitted strips, means for feeding the sheets, means arranged to deflect the strips at different points in their paths of travel to thereby expand the panels and to turn the strips about longitudinal axes and partially flatten the sheet and relieve the tension on the expanded panels, and sets of rotary dies subsequently operating upon the strips to form them into projecting ribs.

7. In a machine for forming ribbed expanded metal from sheets having alternate slitted panels and unslitted strips, inclined stepped series of rolls and cooperating deflecting guides for engaging the strips at different points in the path of travel of the sheet and arranged to continuously advance the sheet and deflect the strips at an angle to the original plane of the sheet to thereby expand the panels, and sets of rolls arranged to receive the strips from said deflecting guides to form the same into ribs, said deflecting guides being formed to rotate the strips about their longitudinal axes toward the general plane of the sheet to thereby flatten or partially flatten the same and relieve the tension on the expanded panels of the sheet before the latter is engaged by said rib-shaping rolls.

8. In a machine for forming ribbed expanded metal from sheets having alternate slitted panels and unslitted strips, inclined stepped series of rolls and cooperating deflecting guides for engaging the strips at different points in the path of travel of the sheet and arranged to continuously advance the sheet and deflect the strips at an angle to the original plane of the sheet to thereby expand the panels, said deflecting guides being twisted to permit the gradual turning of the strips about longitudinal axes to partially flatten the sheet and relieve the tension transversely of the expanded sheet, and two series of rotary dies arranged respectively at and beyond the delivery ends of said deflecting guides and adapted to act successively on the strips to form the same into ribs and completely flatten the sheet.

9. In a machine for forming ribbed expanded metal from sheets having alternate slitted and unslitted panels, a set of feed rolls having means for forming shallow ribs in the strips, sets of rolls and deflecting guides arranged in stepped series inclined to the initial path of movement of the sheet and adapted to engage and deflect the strips to expand the panels, said rolls and guides having ribs and grooves for engaging the shallow ribs of the strips and holding the sheet against displacement as it is expanded and said deflecting guides being twisted to permit the progressive rotation of the strips about longitudinal axes toward the general plane of the sheet, and rotary dies arranged to receive the sheet from said deflecting guides and form the strips into relatively deep ribs.

10. In a machine for forming ribbed expanded metal from sheets having alternate slitted and unslitted panels, a set of feed rolls having means for forming shallow ribs in the strips, sets of rolls and deflecting guides arranged in stepped series inclined to the initial path of movement of the sheet and adapted to engage and deflect the strips to expand the panels, said rolls and guides having ribs and grooves for engaging the shallow ribs of the strips and holding the sheet against displacement as it is expanded and said deflecting guides being twisted to permit the gradual twisting of the strips to partially flatten the expanded sheet and relieve the transverse tension thereon, and two series of sets of initial rib-shaping and rib-finishing rolls arranged respectively at and beyond the delivery ends of said deflecting guides and adapted to act successively upon the strips to form the same into relatively deep ribs and completely flatten the sheet.

11. In a machine for forming ribbed expanded metal from sheets having alternate slitted panels and unslitted strips, the combination with means for feeding the sheet of stepped series of guides for engaging and deflecting strips at different points in the path of travel of the sheet and at an angle to the longitudinal plane of the sheet to expand the panels, said deflecting guides being twisted to permit the gradual rotation of the strips about longitudinal axes to flatten or partially flatten the sheet and relieve the tension on the expanded panels, sets of rolls for receiving the strips from said deflecting guides and forming the same into relatively shallow rudimentary ribs, guides for receiving the strips from said initial ribbing rolls arranged to gradually reduce the spacing between the strips, and a set of ribbed finishing-rolls arranged to receive the strips from said latter guides and form the same into relatively deep ribs.

12. The method of forming ribbed expanded metal from sheets having alternate slitted panels and unslitted strips, which consists in progressively deflecting the consecutive unslitted strips at points spaced apart longitudinally of the sheet and thereby expanding the panels, and guiding the strips as they leave the deflecting points so as to gradually relieve the tension on the expanded panels and then forming the strips into ribs.

13. In a machine for forming ribbed expanded metal from sheets having alternate slitted panels and unslitted strips, the combination with means for continuously advancing the sheet, of devices for deflecting the strips at different points in their paths of travel at an angle to and to one side of the original plane of the sheet to thereby expand the panels, said deflecting means being arranged to rotate or permit the rotation of the strips about longitudinal axes toward the general plane of the sheet and thereby relieve tension on the expanded panels and means for subsequently forming the strips into ribs.

14. The method of forming ribbed expanded metal from sheets having alternate slitted panels and unslitted strips, which consists in continuously advancing the sheet, deflecting the unslitted strips at different points in their paths of travel to one side and at an angle to the original plane of the sheet to thereby expand the panels, gradually rotating the strips about longitudinal axes toward the general plane of the sheet as they leave the deflecting points to thereby relieve tension on the expanded panels, and subsequently forming the strips into ribs.

GEO. W. BAKER.
JAMES H. DEAN.